UNITED STATES PATENT OFFICE 2,592,550

FLEXIBLE PRESSURE-SENSITIVE ADHESIVE PRODUCTS

Edward W. Engel, Etzio J. Giolito, and James A. McGarry, New Brunswick, Vlon N. Morris, Highland Park, and Charles L. Weidner, Cranbury, N. J., assignors to Industrial Tape Corporation, a corporation of New Jersey No Drawing. Application October 6, 1949, Serial No. 119,998

7 Claims. (Cl. 117—122)

This invention relates to normally tacky and pressure-sensitive adhesive tapes based on flexible impregnated non-woven fiber backings.

Products of this type are used to advantage in packaging, paint masking, bundling, mending and in many other applications. In the prior art such products were relatively cumbersome to prepare and accordingly expensive. The non-woven fibrous backing required a plurality of treatments to produce a tape that would hold the adhesive securely without upsetting the individual layer or patches thereof and that would be strong enough internally to resist the delaminating forces of said pressure-sensitive adhesive. For instance, pressure-sensitive adhesive tape backings of the prior art required one or more layers of impregnant, a layer of a backsize or repellent to improve resistance against delamination and one or more layers of primers to aid in anchoring the pressure-sensitive adhesive to the backing. Moreover, and while there were two methods available for saturating the paper with the impregnant, the one method, using non-aqueous solutions of the saturating agent, was expensive and hazardous, and the other, using dispersions thereof, produced in many cases a tape which had a tendency to wrinkle, curl or buckle, particularly when the finished product was stacked, for instance, in rolls or in superposed layers.

It is an object of this invention to provide normally tacky and pressure-sensitive adhesive tapes which are resistant to delamination. It is a further object of the invention to provide such adhesive tapes wherein the adhesive is anchored directly and securely to the backing. A still further object of the invention is a normally tacky and pressure-sensitive adhesive tape which does not curl or block even when a backing impregnated from aqueous dispersion is used and when the product is stacked in layers or rolls. Among further objects of the invention are the provision of an economical pressure-sensitive tape product and of one that is easy to make and convenient to handle. Yet other objects will be apparent from the following disclosure:

In accordance with the invention a normally tacky and pressure-sensitive tape product comprises a pressure-sensitive adhesive of the rubber-like butadiene type united directly to a non-woven fibrous backing that is saturated to the extent of from forty to sixty per cent by weight of the weight of the finished backing with an impregnant comprising per hundred parts by weight of the composition to forty parts of a butadiene styrene copolymer comprising at least twenty per cent styrene and at least forty per cent butadiene, ten to forty parts of a butadiene styrene copolymer comprising at least five per cent butadiene and at least eighty five per cent styrene, and from fifty to eighty parts of a butadiene acrylonitrile copolymer comprising at least forty per cent butadiene and at least thirty per cent acrylonitrile. In addition, the impregnant may contain a very minor proportion, up to ten per cent, of an antioxidant or stabilizing agent, for instance, one of the type disclosed in the application for Letters Patent of John F. McElroy, Serial No. 103,544, filed July 7, 1949, or a condensation product of acetone and diphenyl amine, dipara phenyl guanidine, heptylated diphenyl amine, hydroquinone monobenzyl ether, ditertiary butyl hydroquinone or any standard antioxidant for butadiene rubbers. In preferred embodiments of the invention the impregnant is applied from aqueous dispersion comprising from thirty per cent to forty-five per cent solids by weight. The particles of the impregnant may be as finely divided as possible, although particle sizes of less than two microns and preferably of less than one-half micron are generally most useful.

The term rubber-like butadiene type pressure-sensitive adhesive includes pressure-sensitive adhesives which are more cohesive than adhesive yet still quite tacky under normal finger pressure and wherein the cohesive ingredient is taken from the group comprising natural rubber, butadiene copolymers with styrene, acrylonitrile or acrylates or linear acrylate esters; or reclaims or treated, i. e., cyclized or phenol or other derivatives of these elastomers. However, it should be noted that in the case of adhesives based on acrylic copolymers a higher ratio of acrylonitrile in the butadiene acrylonitrile copolymer of the impregnant is preferred for best unification of the backing than in the case of adhesives based on natural rubber or butadiene styrene copolymers. Of course, mixtures or combinations of the various cohesive bases of normally tacky and pressure-sensitive adhesives may be present in one and the same adhesive.

The product obtained by this treatment is highly unified, being resistant to both separation of adhesive from the backing and delamination and other destruction of the backing, for instance, on unrolling or during or after prolonged storage.

To illustrate representative embodiments of the invention by way of example only but not to limit the scope of the invention in any way several examples of preferred embodiments are shown. The proportions in all of these examples are furnished as parts by weight of the compositions given.

EXAMPLE I

A highly porous absorbent paper having a weight of the order of seventy-five pounds per ream of four hundred and eighty sheets, twenty-four by thirty-six inches in size, preferably uncalendered and unsized but having rugosities such as are obtained by crimping or embossing, was saturated by passing it through an impregnant bath containing an aqueous dispersion having forty per cent solids and of the following composition:

| | Parts |
|---|---|
| Copolymer of 60 per cent butadiene and 40 per cent acrylonitrile | 65 |
| Copolymer of 50 per cent butadiene and 50 per cent styrene | 20 |
| Copolymer of 10 per cent butadiene and 90 per cent styrene | 14.5 |
| Standard antioxidant (heptylated diphenyl amine) | 0.5 |

The paper was saturated to contain impregnant solids to the extent of one hundred per cent of its original weight. The sheet was dried, for instance, in a festoon. After drying, a normally tacky and pressure sensitive adhesive mass was applied having the following composition:

| | Parts |
|---|---|
| Reclaim rubber | 30 |
| Crude rubber | 50 |
| Hydrogenated rosin | 95 |
| Calcium silicate | 60 |
| Mineral oil | 30 |
| Phenyl beta napthylamine | 2 |

The adhesive mass was applied from normal heptane solvent by a reverse roll coater in this particular operation although hot melt coating, calendering, disperse coating, knife coating or any other desirable method may be resorted to instead. The adhesive had a coating weight of approximately 2.65 ounces per square yard. The resultant product without further treatment was satisfactory in every respect as a pressure-sensitive adhesive tape.

Several other examples showing widely varied specific proportions are illustrated in the table that follows:

TABLE OF EXAMPLES

| Example Number | II | III | IV | V | VI | VII | VIII | IX | X |
|---|---|---|---|---|---|---|---|---|---|
| | Paper Flat | Paper Flat | Paper Flat | Paper Creped | Paper Flat | Paper Creped | Paper Creped | Paper Flat [5] | Paper Creped |
| Backing: | | | | | | | | | |
| Weight per ream (lbs.) | 17 | 40 | 30 | 32 | 55 | 27 | 55 | 50 | 30 |
| Type | Rope | Fiber | Alpha | Cellulose | Rope Fiber | Alpha | Cellulose | Non Woven Fabric | Alpha Cellulose |
| Impregnant (Parts of Ingredients): | | | | | | | | | |
| Acrylonitrile (35%)—Butadiene (65%) Copolymer [1] | 75 | | | | | 50 | 60 | | |
| Acrylonitrile (40%)—Butadiene (60%) Copolymer [1] | | 70 | 70 | 60 | 55 | | | | |
| Acrylonitrile (55%)—Butadiene (45%) Copolymer [1] | | | | | | | | 65 | 65 |
| Butadiene (70%)—Styrene (30%) Copolymer [1] | 5 | | | 20 | | | | | |
| Butadiene (50%)—Styrene (50%) Copolymer [1] | | 10 | | | | 30 | 14.5 | 15 | 14.5 |
| Butadiene (35%)—Styrene (65%) Copolymer [2] | | | 20 | | 24.5 | | | | |
| Butadiene (5%)—Styrene (95%) Copolymer [2] | 19.5 | | | 19 | 20 | 19.5 | | 19.5 | |
| Butadiene (10%)—Styrene (90%) Copolymer [2] | | | 9.5 | | | | 25 | | 20.0 |
| Butadiene (15%)—Styrene (85%) Copolymer | | 19.5 | | | | | | | |
| Antioxidant [3] | 0.5 | 0.5 | 0.5 | 1 | 0.5 | | 0.5 | 0.5 | .5 |
| Per Cent Impregnation [4] | 100 | 90 | 80 | 100 | 90 | 100 | 100 | 120 | 100 |
| Monomer Ratios of Above: | | | | | | | | | |
| Acrylonitrile | 26 | 28 | 28 | 24 | 22 | 17.5 | 21 | 36 | 36 |
| Butadiene | 53.5 | 50 | 50 | 51 | 42.5 | 48.5 | 49 | 37.5 | 38.5 |
| Styrene | 20 | 21.5 | 21.5 | 24 | 35 | 33.5 | 29.5 | 26 | 25 |
| A. O. | .5 | .5 | .5 | 1 | .5 | .5 | .5 | .5 | .5 |
| Pressure Sensitive Adhesive: | | | | | | | | | |
| Butadiene (75%)—Styrene (25%) Copolymer [1] | | | | 50 | 50 | 50 | 100 | 50 | 50 |
| Rubber, Crude Natural | | | 50 | 50 | 50 | 100 | 100 | 50 | 50 |
| Rubber, Reclaim Natural | 167 | 167 | 84 | 84 | | | | | 80 |
| Coumarone-Indene Resin, refined (M. P. 70° C.) | 90 | | | | | | | | |
| Rosin, dehydrogenated | | 90 | 90 | 90 | 90 | 90 | 90 | 90 | 95 |
| Calcium silicate | 40 | | 60 | 60 | 90 | 90 | 90 | 90 | 60 |
| Zinc Oxide | | 40 | | | | | | | |
| Mineral Oil | 30 | 30 | 30 | 30 | 30 | 30 | 30 | 30 | 30 |
| Phenyl beta Naphthylamine or other rubber antioxidant | 2 | 2 | 2 | 2 | 2 | 2 | 2 | 2 | 2 |
| Adhesive weight in ounces per square yd. | 1.5 | 2.75 | 2.0 | 2.65 | 3.0 | 2.75 | 3.5 | 3.50 | 2.75 |

[1] Preferred Mooney Value 40-100; works best at Mooney value near fifty.
[2] Preferred Mooney value 70-125; works best near Mooney value of 80.
[3] e. g., as suggested earlier in the specification.
[4] Based on original weight of backing.
[5] Patent 2,039,312.

The adhesive masses in these examples may be applied to coating weights varying from one-half to five ounces per square yard. Coating weights of one and one-half to four ounces are preferred, depending upon the nature and thickness of the specific paper backing, upon the adhesive and elastic nature of the adhesive mass and also upon the properties of the adhesive sheet.

The use of impregnants comprising from ten to twenty parts of the lower styrene content copolymer, from fifteen to twenty-five of the high styrene copolymer and from fifty-five to seventy-five per cent acrylonitrile copolymer is preferred.

In preferred embodiments of the invention the fibrous web is treated with impregnant to produce within the paper a weight ratio of from fifteen to forty per cent of copolymerized acrylonitrile, from thirty to sixty per cent copolymerized butadiene and from twenty to forty per cent copolymerized styrene. While in preferred examples of the invention which are illustrated above these weight ratios are obtained by the use of a system of three copolymers comprising butadiene and acrylonitrile, and butadiene and styrene in two weight ratios, respectively, it will be understood that closely similar effects satisfactory for many purposes of the invention may be obtained by combining different sets of copolymers of two or more components so as to obtain the ratios listed above.

Many other aspects of the above described invention will be apparent to those skilled in the art and are included in the inventive concept.

What is claimed is:

1. A pressure-sensitive adhesive product having as a backing, a flexible bonded sheet comprising a fibrous paper web of an initially porous material, the fibers of which are bonded together internally of the web by particles of an impregnating agent which have entered the pores of the web, saturating it to the extent of from about forty to about sixty per cent of its weight, said impregnating agent comprising per hundred parts of its weight: from about fifteen to about fifty parts of butadiene styrene copolymer averaging at least about twenty per cent styrene and at least about forty per cent butadiene, from about ten to about forty parts of a butadiene styrene copolymer comprising at least about five per cent butadiene and at least about eighty-five per cent styrene and from about fifty to about eighty parts of a butadiene acrylonitrile copolymer comprising at least about forty per cent butadiene and at least about thirty per cent acrylonitrile, the particles of said copolymers being predominantly less than four microns in diameter, and a normally tacky and pressure-sensitive butadiene type adhesive coated onto said backing, said backing being characterized by high tensile strength and great resistance to force exerted by the pressure-sensitive adhesive tending to separate and delaminate said backing and to separate said adhesive from said backing when the product is separated from rolls or stacks thereof.

2. A pressure-sensitive adhesive product having as a backing, a flexible bonded sheet comprising a fibrous paper web of an initially porous material, the fibers of which are bonded together internally of the web by particles of an impregnating agent which have entered the pores of the web, saturating it to the extent of from about forty to about sixty per cent of its weight, said impregnating agent comprising per hundred parts of its weight: from about ten to about twenty parts of a butadiene styrene copolymer comprising at least about twenty per cent styrene and at least about forty per cent butadiene, from about ten to about forty parts of a butadiene styrene copolymer comprising at least about five per cent butadiene and at least about eighty-five per cent styrene and from about fifty to about eighty parts of a butadiene acrylonitrile copolymer comprising at least about forty per cent butadiene and at least about thirty per cent acrylonitrile, the particles of said copolymers being predominantly less than two microns in diameter, and a normally tacky and pressure-sensitive butadiene type adhesive coated onto said backing, said backing being characterized by high tensile strength and great resistance to force exerted by the pressure-sensitive adhesive tending to separate and delaminate said backing and to separate said adhesive from said backing when the product is separated from rolls or stacks thereof.

3. A pressure sensitive adhesive product having as a backing, a flexible bonded sheet comprising a fibrous paper web of an initially porous material, the fibers of which are bonded together internally of the web by particles of an impregnating agent which have entered the pores of the web, saturating it to the extent of from about forty to about sixty per cent of its weight, said impregnating agent comprising per hundred parts of its weight: from about five to about forty parts of a butadiene styrene copolymer comprising at least about twenty per cent styrene and at least about forty per cent butadiene, from about fifteen to about twenty-five parts of a butadiene styrene copolymer comprising at least about five per cent butadiene and at least about eighty five per cent styrene and from about fifty to about eighty parts of a butadiene acrylonitrile copolymer comprising at least about forty per cent butadiene and at least about thirty per cent acrylonitrile, the particles of said copolymers being predominantly less than two microns in diameter, and a normally tacky and pressure-sensitive butadiene type adhesive coated onto said backing, said backing being characterized by high tensile strength and great resistance to force exerted by the pressure-sensitive adhesive tending to separate and delaminate said backing and to separate said adhesive from said backing when the product is separated from rolls or stacks thereof.

4. A pressure-sensitive adhesive product having as a backing, a flexible bonded sheet comprising a fibrous paper web of an initially porous material, the fibers of which are bonded together internally of the web by particles of an impregnating agent which have entered the pores of the web saturating it to the extent of from about forty to about sixty per cent of its weight, said impregnating agent comprising per hundred parts of its weight: a very minor proportion, less than ten parts of antioxidant, from about five to about forty parts of a butadiene styrene copolymer comprising at least about twenty per cent styrene and at least about forty per cent butadiene, from about ten to about forty parts of a butadiene styrene copolymer comprising at least about five per cent butadiene and at least about eighty-five per cent styrene and from about fifty to about eighty parts of a butadiene acrylonitrile copolymer comprising at least about forty per cent butadiene and at least about thirty per cent acrylonitrile, the particles of said copolymers being predominantly less than one-half micron in diameter, and a normally tacky and pressure-sensitive butadiene type adhesive coated onto said backing, said backing being characterized by high tensile strength and great resistance to force exerted by the pressure-sensitive adhesive tending to separate and delaminate said backing and to separate said adhesive from said backing when the product is separated from rolls or stacks thereof.

5. A pressure-sensitive adhesive product having as a backing, a flexible bonded sheet comprising a fibrous paper web of an initially porous material, the fibers of which are bonded together internally of the web by particles of an impregnating agent which have entered the pores of the web, saturating it to the extent of from about forty to about sixty per cent of its weight, said impregnating agent comprising per hundred parts of its weight: from about five to about forty parts of a butadiene styrene copolymer comprising at least about twenty per cent styrene end at least about forty per cent butadiene, from about ten to about forty parts of a butadiene styrene copolymer comprising at least about five per cent butadiene and at least about eighty-five per cent styrene and from about fifty to about eighty parts of a butadiene acrylonitrile copolymer comprising at least about forty per cent butadiene and at least thirty per cent acrylonitrile and a normally tacky and pressure-sensitive butadiene type adhesive coated onto said backing, said backing being characterized by high tensile strength and great resistance to force exerted by the pressure-sensitive adhesive tending to separate and delaminate said backing and to separate said adhesive from said backing when the product is separated from rolls or stacks thereof.

6. A pressure-sensitive adhesive product having as a backing, a flexible bonded sheet comprising a non-woven fibrous web of an initially porous material, the fibers of which are bonded together internally of the web by particles of an impregnating agent which have entered the pores of the web, saturating it to the extent of from about forty to about sixty per cent of its weight, said impregnating agent comprising per hundred parts of its weight: from about five to about forty parts of a butadiene styrene copolymer comprising at least about twenty per cent styrene and at least about forty per cent butadiene, from about ten to about forty parts of a butadiene styrene copolymer comprising at least about five per cent butadiene and at least about eighty-five per cent styrene and from about fifty to about eighty parts of a butadiene acrylonitrile copolymer comprising at least about forty per cent butadiene and at least about thirty per cent acrylonitrile, the particles of said copolymers being predominantly less than two microns in diameter, and a normally tacky and pressure-sensitive butadiene type adhesive coated onto said backing, said backing being characterized by high tensile strength and great resistance to force exerted by the pressure-sensitive adhesive tending to separate and delaminate said backing and to separate said adhesive from said backing when the product is separated from rolls or stacks thereof.

7. A pressure-sensitive adhesive product having as a backing a flexible bonded sheet comprising a non-woven fibrous web of an intially porous material, the fibers of which are bonded together internally of the web by particles of an impregnating agent which have entered the pores of the web, saturating it to the extent of from about forty to about sixty per cent of its weight, said impregnating agent comprising copolymers formed within the web and comprising a butadiene-acrylonitrile copolymer admixed with a mixture of copolymers of butadiene and styrene wherein one of said copolymers of butadiene is copolymerized with a minor amount of styrene and another said copolymer of butadienee is copolymerized with a larger amount of styrene in a weight ratio corresponding to: from about fifteen to about forty per cent copolymerized acrylonitrile from about thirty to about sixty per cent copolymerized butadiene and from about twenty to about forty per cent copolymerized styrene, the particles of said copolymers being predominantly less than two microns in diameter, and a normally tacky and pressure-sensitive butadiene type adhesive coated onto said backing, said backing being characterized by high tensile strength and great resistance to force exerted by the pressure-sensitive adhesive tending to separate and delaminate said backing and to separate said adhesive from said backing when the product is separated from rolls or stacks thereof.

EDWARD W. ENGEL.
ETZIO J. GIOLITO.
JAMES A. McGARRY.
VLON N. MORRIS.
CHARLES L. WEIDNER.

REFERENCES CITED

The following references are of record in the file of this patent:

UNITED STATES PATENTS

| Number | Name | Date |
|---|---|---|
| 2,253,922 | Van Cleef | Aug. 26, 1941 |
| 2,281,375 | Nowak | Apr. 28, 1942 |
| 2,458,166 | Homeyer | Jan. 4, 1949 |

OTHER REFERENCES

"Rubber Age," (N. Y.) of February 1944, pages 433–435.

"Ind. Eng. Chem.," vol. 38 of 1946, pages 955–958.